United States Patent [19]

LaBombarbe, Jr.

[11] Patent Number: 5,431,291
[45] Date of Patent: Jul. 11, 1995

[54] HEAT SET NECK FINISH WITH SEGMENTED THREADS

[75] Inventor: Christopher C. LaBombarbe, Jr., Manchester, Mich.

[73] Assignee: Hoover Universal, Inc., Plymouth, Mich.

[21] Appl. No.: 218,419

[22] Filed: Mar. 28, 1994

[51] Int. Cl.⁶ ............................................. B65D 1/02
[52] U.S. Cl. ..................... 215/44; 215/329; 220/296
[58] Field of Search ................ 215/31, 329, 1 C, 307; 220/296, 366

[56] References Cited

U.S. PATENT DOCUMENTS

| | | | |
|---|---|---|---|
| 3,511,403 | 5/1970 | Braun | 215/31 X |
| 4,084,717 | 4/1978 | King | 215/31 X |
| 4,618,515 | 10/1986 | Collette et al. | 215/1 CX |
| 4,721,220 | 1/1988 | Northup | |

FOREIGN PATENT DOCUMENTS 101134 3/1941 Switzerland ..................... 220/296

Primary Examiner—Allan N. Shoap
Assistant Examiner—Christopher McDonald
Attorney, Agent, or Firm—Harness, Dickey & Pierce

[57] ABSTRACT

A blow molded, PET container having a unitarily formed body defining a hollow cavity for receiving a product. The body includes a base, a side wall, a neck finish and a mouth. The neck finish, located at the upper end of the container, is formed from substantially amorphous PET that has been thermally stabilized by a heat treating process. A thread is formed on the neck finish to receive a closure cap. The thread is generally in the form of a raised ridge that spirals at least partially around the neck finish. Spaced interruptions divide the thread into thread segments which reduce the PET needed to form the neck finish. The interruptions reduce the residual stresses in the neck finish and thereby reduce the distortion which occurs in the neck finish during hot filling or hot washing of the container.

12 Claims, 2 Drawing Sheets

HEAT SET NECK FINISH WITH SEGMENTED THREADS

BACKGROUND AND SUMMARY OF THE INVENTION

This invention generally relates to a beverage container. The invention more particularly relates to a hollow, blow molded bottle shaped container of biaxially oriented polyethylene terephthalate. The container is intended to receive a product, such as a liquid, while the product is at an elevated temperature. The container is one of that variety generally known as heat set containers.

Blow molded, biaxially oriented polyethylene terephthalate (PET) containers are known to have a broad spectrum of uses because of their physical properties and characteristics. As they relate to the packaging of liquid beverages, two common classes of PET containers can be distinguished, heat set and non-heat set. The two are distinguished in that heat set containers are adapted to be filled with a liquid while the liquid is at an elevated temperature. This is usually because the liquid has been pasteurized or sterilized. Conversely, non-heat set containers are intended to receive liquids while the liquid is generally at the ambient temperature.

In forming PET containers, an extruded parison or injection molded preform (hereinafter preform for brevity) is initially formed from the PET material. The preform has a substantially cylindrical body which is closed at one end and formed with a mouth opening at the other end which is defined by a neck finish. During the blow molding process, the preform is positioned within a mold cavity where it is held by its neck finish between the mold halves. To impart the biaxial orientation into the PET material, the preform is longitudinally stretched, usually by a push rod, and laterally expanded by the injection of blowing medium into the interior of the preform. As a result of the axial and radial expansion, the side walls of the container, as well as transition areas between the side walls and both the neck finish and base, are biaxially oriented. The biaxial orientation of the container increases the container's stiffness and strength as well as improves its gas barrier properties and transparency. The majority of the neck finish and base, however, remains as substantially amorphous PET.

In the past, most PET containers were used to contain liquids that were initially dispensed into the container at room or a chilled temperature. Ever increasingly, however, there has been more interest in using PET containers for so called "hot fill" applications. In a hot fill application, the product is disposed into the container at an elevated temperature and the container is then is immediately sealed.

Hot fill applications impose additional mechanical stresses on the various container structures. Immediately after the hot fill product is disposed into the container, the temperature of the product causes the rigidity of the PET material to decrease, making the container susceptible to residual and unrelaxed retractive stresses. Additionally, the container must sustain internal pressure changes while maintaining its desired configuration. For example, as the hot fill product cools, it shrinks in volume. This has the effect of inducing a negative pressure within the container which must be withstood both in terms of aesthetic considerations and mechanical consideration.

Even after biaxial orientation, the container lacks thermal stability. Retractive stresses in the oriented side walls result in the PET material having a memory that will contract if subjected to filling with a hot liquid. Residual stresses in the amorphous PET material of the neck finish and base make them susceptible to thermal deformation. To enable the container to withstand the various effects of a hot fill application, the container is heat treated.

During heat treatment, the container is constrained in its molded shape and exposed to an elevated temperature for a predetermined period of time. The heat setting temperature is typically considerably higher than the normal temperature to which the container will be exposed during hot filling and use. During the heat filling process, the PET material rapidly undergoes crystallite melting, recrystallization, growth and structural rearrangements which increase the crystallinity of the PET. PET having an increased crystallinity exhibits a more stable morphology which has a reduced tendency to shrink when exposed to temperatures below that used in heat setting. An initially formed PET container is comprised of both oriented and amorphous regions of PET material. These regions react differently to the heat setting process with the oriented side walls remaining clear after heat setting and the amorphous neck finish and base, as well as the slightly oriented transition areas between these regions and the side walls, becoming opaque. This opacity is a result of the formation of spherite crystallites in the amorphous regions during heat setting. The amorphous regions also exhibit residual stresses, which during the heat setting process, can cause an unsatisfactory degree of shrinkage.

The heat setting and crystallization process relaxes the retractive stresses and reduces the residual stresses in the PET resulting in a more thermally stable container, one with a much reduced tendency to shrink or distort when exposed to fill temperatures below that used in heat setting process. During crystallization, the residual stresses in the amorphous regions tend to cause shrinkage in those areas. Since shrinkage is greatest in those areas with the greatest concentrated stress, excessive amounts of shrinkage can produce an inadequate seal between the closure cap and the neck finish resulting in leakage from the container.

With the above limitations in mind, it is an object of the present invention to provide a PET container suitable for use in hot fill applications.

Another object of the present invention is to provide a PET container which is less susceptible to thermal deformation during heat treating.

Still another object of the present invention is to provide a PET container which exhibits diminished shrinkage as a result of residual stresses in the neck finish.

Yet another object of this invention is to provide a PET container in which a reduced amount of PET material is used in forming the neck finish.

A further object of this invention is to produce a PET container having segmented threads on its neck finish.

Another object of this invention is to provide a container in which the residual stresses are uniformly reduced.

In accordance with the present invention, a blow molded, biaxially oriented PET container, for hot fill application, is formed from a preform whose neck finish has been modified to reduce the thermal deformation effects of the residual stresses in the amorphous PET material. By forming the preform according to the principles of this invention, the neck finish of the blown container is capable of being heat treated and hot filled without experiencing undue shrinkage or other deformation. To reduce the shrinkage which occurs as a result of the residual stresses, the amount of residual stress in the neck finish is itself reduced. This is accomplished by a reduction in the amount of amorphous PET used in forming the neck finish.

As further discussed below, this reduction is residual stress is principally achieved by altering the formation of the threads on the exterior surface of the neck finish. Rather than the typical continuous thread which extends around the neck finish, the present invention substitutes a series of thread segments which are circumferentially spaced apart around the neck finish. The thread segments are generally in the form of a raised ridge which would, if not separated by a gap or recess, extend in a continuous spiral around the neck finish up toward the mouth of the container. Thus, each thread segment extends with the other thread segments along a generally spiraled path. The gaps between the thread segments are circumferentially spaced around the neck finish so that one gap is positioned at approximately 30° intervals. The substantially equidistant circumferential spacing of the gaps helps to assure that the reduction in residual stress is uniformed around the neck finish. As a result of the reduction in residual stress, the neck finish of a container produced according to the principles of the present invention will be less susceptible to thermal distortion or deformation during hot filling and capping thereby resulting in a container that is less likely to leak or exhibit other undesirable attributes which would render the container unusable.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE PREFERRED EMBODIMENT

Figure 1:
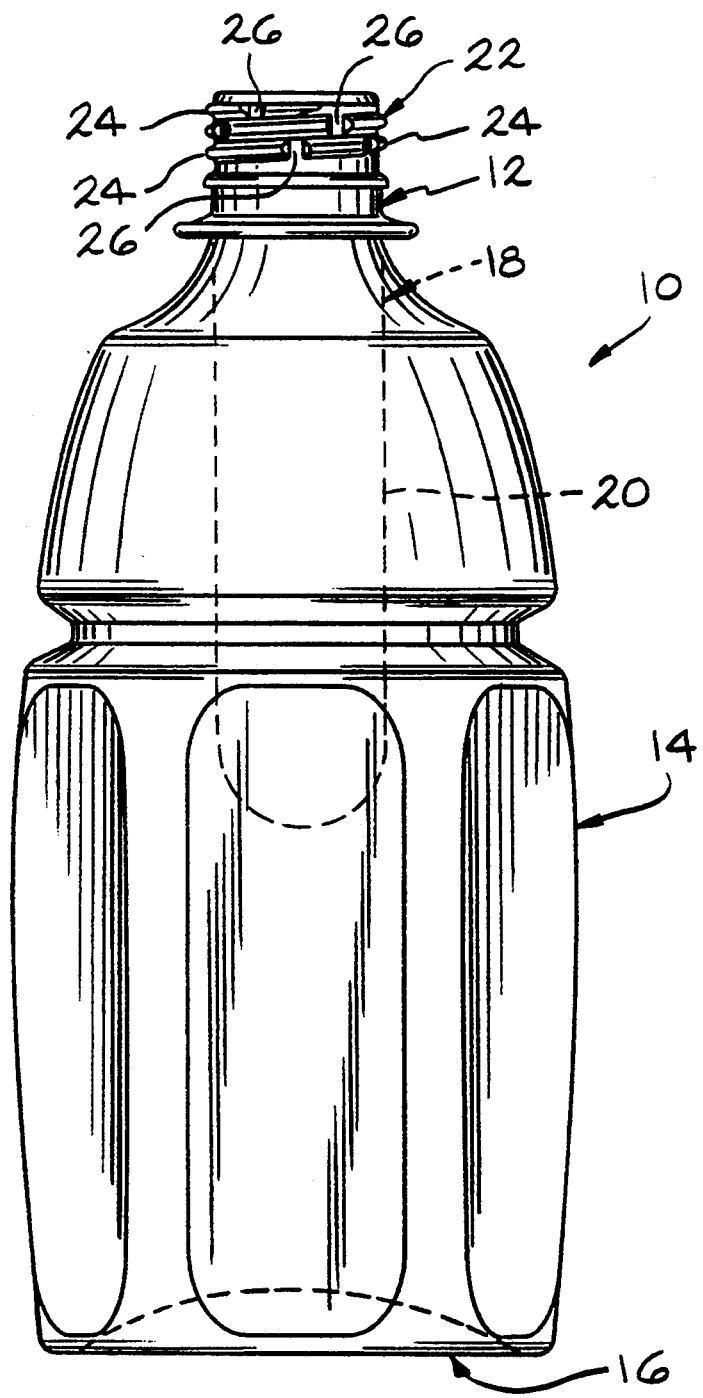
FIG. 1 is a side elevational view of a container embodying the principles of the present invention.

Referring now to the drawing, a suitable polyester, preferably polyethylene terephthalate (PET), container according to the principles of the present invention is generally illustrated therein and designated at 10. The principal elements of the container 10 are a neck finish 12, a side wall 14 and a base 16. As seen in FIG. 1, the neck finish 12 is unitarily formed with the upper end of the side wall 14 and the base 16 is unitarily formed with the lower end of the side wall 14. Additionally, the neck finish 12 operates to define a mouth 17 through which the container 10 is filled with the product, beverage or liquid (hereinafter liquid) and through which the liquid is dispensed.

The container 10 is blow molded from a preform 18. The preform 18 is illustrated in phantom in FIG. 1 and is typically formed by either extrusion methods or injection molding techniques. During blow molding, the neck finish 22 of the preform 18 is clamped between mold halves (not shown) so that preform's test tube-like body 20 extends and is suspended in the mold cavity. With the temperature of the preform 18 above its class transition temperature, the body 20 is axially stretched, typically by a stretch rod extended within the body 20, and radially expanded, by the forcing a blowing medium into the body 20 of the preform 18. The axial elongation and radial expansion of the preform body 20 results in the biaxial orientation of the PET material forming the side wall 14 of the container 10 as well as a portion of those areas where it makes the transition into the neck finish 12 and base 16. Obviously, the side wall 14 can be formed in a number of different configurations having the desired structural characteristics, product identification and aesthetic intent. With heat set containers 1 0, the side wall 14 is often formed with panels that will accommodate internal pressure changes while maintaining the desired aesthetics and consumer appeal.

The present invention reduces the effects of the residual stresses in the amorphous neck finish 12 of the container 10 by reducing the overall amount of residual stress contained therein. Typically, the mouth 17 and neck finish 12 of the PET container 10 is adapted to receive a closure cap (not shown). For this reason, the neck finish 12 must be capable of restraining the mechanical loads imposed by the closure cap. In the present invention, a threaded engagement is used to secure the closure cap to the neck finish 12.

As seen in the figures, a thread 22 is formed on the neck finish 12 in the general shape of a raised ridge around the neck finish 12. The thread 22 forms a spiral which extends approximately 810° around the neck finish 12 in an area adjacent to the mouth 17. While shown as a single thread 22, it will be understood by one skilled in the art that the present invention is equally applicable to a container 10 having a greater number of threads extending the same or a lesser number of degrees around the neck finish 12 or only partly therearound. The thread 22 itself is actually comprised of a number of individual thread segments 24 which are longitudinally aligned and located end to end so as to form the spiral thread 22. Each thread segment 24 is separated from the next thread segment 24 by an interruption, gap or recess 26. The recesses 26 decrease the amount of PET material needed to form the thread 22 and results in a reduced amount of PET material being required to form the neck finish 12 of the container 10. Corresponding to the reduced amount of PET material, the residual stresses located in the neck finish 12 are also reduced and the distortion associated with neck finish 12 during exposure to a liquid at an elevated temperature, such as during hot filling, is reduced.

Figure 2:
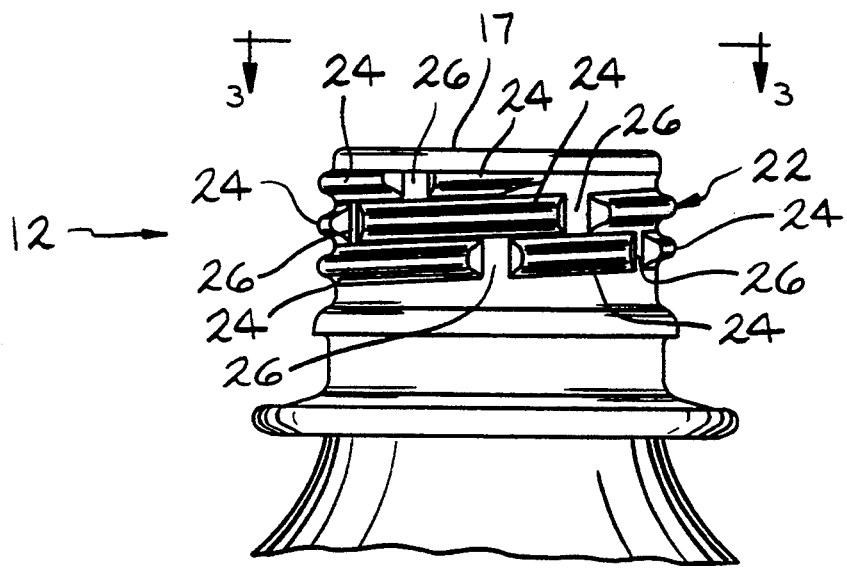
FIG. 2 is an enlarged side elevational view of a portion of the container illustrated in FIG. 1.
Figure 3:
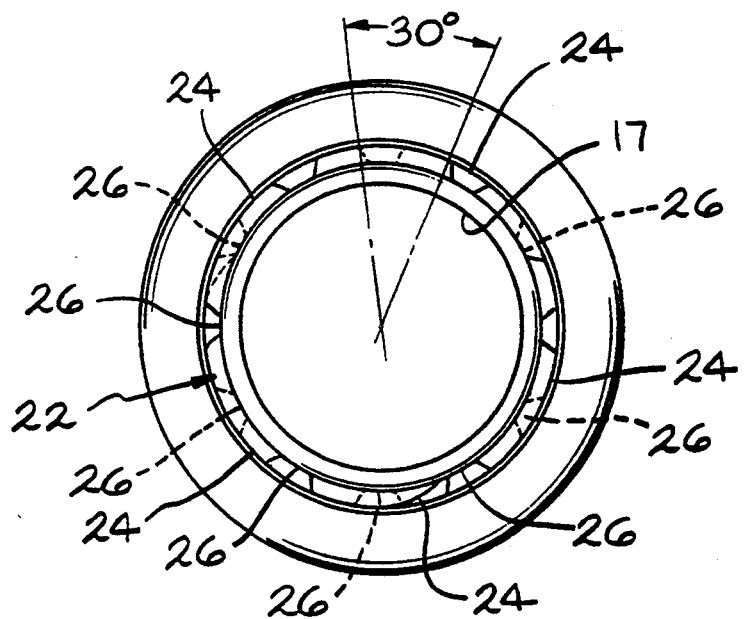
FIG. 3 is a plan view of the enlarged portion of the container illustrated in FIG. 2.

Care must be taken, however, to ensure that the alleviation of the residual stress is uniform about the neck finish 12. As best seen in FIGS. 2 and 3, the present invention achieves a uniform reduction in the residual stresses by locating the recesses 26 such that one recess 26 is circumferentially positioned approximately every 30° around the neck finish 12. By locating the recesses 26 at substantially 30° intervals and providing for only twelve recesses 26, the recesses 26 are positioned so that all of the recesses are vertically offset from one another. In other words, no two recesses 26 are vertically aligned with one another. This combination of vertical offset and circumferential spacing results in the individual thread segments 24 having various lengths.

The recesses 26 are formed so that the lowermost surface defining the recess 26 is coincidental with the remaining exterior surface of the neck finish 12. Thus, the recess 26 is only defined in the thread 22 and is not further defined in the neck finish 12.

While the present invention is particularly described in connection with hot fill containers, it will be understood that the invention is also applicable to returnable PET bottles that are cleaned using a hot caustic wash. Many of these returnable bottles are used to contain carbonated products. In these situations, the crystallized finish with vents of the present invention help the container to repeatedly survive the hot washing process. It is also believed that in those situations where vents are required to help allow pressurized gases from the product to escape during opening of the container, the pressure release can create considerable stress induced distortions when the thread gaps or vents are in line or aligned. By positioning the gaps as described in this invention, distortion is significantly reduced.

While the above description constitutes the preferred embodiments of the present invention, it will be appreciated that the invention is susceptible to modification, variation and change without departing from the proper scope and fair meaning of the accompanying claims.

I claim:

1. A polyester container adapted for exposure to a liquid at an elevated temperature, said container comprising:
   a unitarily formed container body defining a hollow cavity for receiving a product therein, said body including a base, a side wall, a neck finish and a mouth which defines an opening into said cavity;
   said base located at a lower end of said container and being unitarily formed with said side wall at a lower end thereof;
   said neck finish located at an upper end of said container and being unitarily formed with said side wall at an upper end thereof, said neck finish also being formed from substantially amorphous polyester which has been heat treated for thermal stability; and
   a thread included on said neck finish and adapted to receive a closure cap thereon to contain the product within said container, said thread formed by at least one raised ridge which extends at least partially around said neck finish in a general spiral fashion, a plurality of interruptions being defined in said thread and being circumferentially equidistantly spaced about said neck finish, each of said interruptions being equidistantly spaced from circumferentially adjacent interruptions, said interruptions dividing said thread into a plurality of thread segments, said interruptions each defining a recess in said thread reducing the amount of material required to form said thread, said reduced amount of material uniformly reducing the residual stresses located in said neck finish and thereby reducing the occurrence of distortion in said neck finish during exposure to a liquid at an elevated temperature.

2. A container as set forth in claim 1 wherein said recesses extend to a depth coincidental with the remainder of said neck finish.

3. A container as set forth in claim 1 wherein said recesses are angularly spaced around said neck finish at substantially thirty (30) degree intervals.

4. A container as set forth in claim 1 wherein said container is blow molded.

5. A container as set forth in claim 1 wherein said neck finish is formed of crystallized PET.

6. A container as set forth in claim 1 wherein said recesses are vertically offset from one another.

7. A polyethylene terephthalate (PET) container capable of being exposed to a liquid at an elevated temperature, said container comprising:
   a unitarily formed container body defining a hollow cavity for receiving the product, said body including a base, a side wall, a neck finish and a mouth which defines an opening into said cavity;
   said base located at one end of said container and being unitarily formed with said side wall at the lower end thereof;
   said neck finish located at the other end of said container and being uniformly formed with said side wall at the upper end thereof, said neck finish being formed from substantially amorphous PET which has been heat treated to thermally stabilize said neck finish; and
   a plurality of thread segments included on an exterior surface of said neck finish and adapted to receive a closure cap thereon to retain the product within said container, each of said thread segments formed by a raised ridge that generally cooperates with others of said thread segments to form a spiral at least partially around said neck finish, said thread segments being substantially equidistantly spaced apart from one another and having a recess defined therebetween, said recesses being circumferentially located at equal angular intervals such that only one of said recesses being located in each of said intervals and no two of said recesses vertically correspond with one another, said recesses reducing the amount of PET material required to form said neck finish and uniformly reducing the residual stresses located in said neck finish so as to uniformly control and reduce distortion which occurs in said neck finish during exposure to a liquid at an elevated temperature.

8. A container as set forth in claim 7 wherein said recesses are angularly spaced around said neck finish at substantially thirty (30) degree intervals.

9. A container as set forth in claim 7 wherein said neck finish is formed of crystallized PET.

10. A container as set forth in claim 7 wherein at least some of said thread segments exhibit lengths differing from the lengths of others of said thread segments.

11. A polyester preform adapted to form a blow molded container capable of withstanding exposure to liquids at an elevated temperature such as when filled with a product at an elevated temperature or when subjected to a hot, caustic wash, said preform comprising:
    a unitarily formed preform body defining a central hollow cavity, said preform body including a base portion, a side wall portion, a neck finish and a mouth which defines an opening into said cavity;
    said base portion located at one end of said preform body and unitarily formed with said side wall portion at the lower end thereof;
    said neck finish located at the other end of said preform body and unitarily formed with said side wall portion at the upper end thereof, said neck finish being formed from substantially amorphous material; and a plurality of thread segments included on an exterior surface of said neck finish and adapted to receive a closure cap thereon to contain the product within said container, each of said thread segments formed by a raised ridge and said thread segments cooperating with other thread segments to generally form a spiral at least partially around said neck finish, said thread segments being spaced apart from one another and defining a recess between adjacent ones of said thread segments, each of said recesses being spaced about said neck finish at substantially equal angular intervals from circumferentially adjacent ones of said recesses such that no two of said recesses vertically correspond with one another, said recesses uniformly reducing the amount of material located in said neck finish and uniformly reducing the residual stresses contained in said neck finish, the uniform reduction of residual stress correspondingly producing a generally uniform reduction in the distortion which occurs in said neck finish during hot filling or hot washing of said container formed from said preform.

12. A preform as set forth in claim 11 wherein said recesses are angularly spaced about said neck finish at substantially thirty (30) degree intervals.

* * * * *